US012573566B2

(12) United States Patent
Nishishita et al.

(10) Patent No.: US 12,573,566 B2
(45) Date of Patent: Mar. 10, 2026

(54) ELECTRIC DOUBLE-LAYER CAPACITOR AND ITS MANUFACTURING METHOD USING AN AQUEOUS ELECTROLYTIC SOLUTION

(71) Applicant: Tokin Corporation, Shiroishi (JP)

(72) Inventors: Satoshi Nishishita, Shiroishi (JP); Shinji Miyata, Shiroishi (JP); Keisuke Oga, Shiroishi (JP)

(73) Assignee: TOKIN CORPORATION, Shiroishi (JP)

( * ) Notice: Subject to any disclaimer, the term of this patent is extended or adjusted under 35 U.S.C. 154(b) by 99 days.

(21) Appl. No.: 18/354,537

(22) Filed: Jul. 18, 2023

(65) Prior Publication Data

US 2024/0055194 A1 Feb. 15, 2024

(30) Foreign Application Priority Data

Aug. 10, 2022 (JP) ................................ 2022-127645

(51) Int. Cl.
| | |
|---|---|
| *H01G 11/62* | (2013.01) |
| *H01G 11/38* | (2013.01) |
| *H01G 11/34* | (2013.01) |
| *H01G 11/42* | (2013.01) |
| *H01G 11/84* | (2013.01) |

(52) U.S. Cl.
CPC ............. *H01G 11/62* (2013.01); *H01G 11/38* (2013.01); *H01G 11/34* (2013.01); *H01G 11/42* (2013.01); *H01G 11/84* (2013.01)

(58) Field of Classification Search
None
See application file for complete search history.

(56) References Cited

U.S. PATENT DOCUMENTS

2011/0304964 A1* 12/2011 Fleischer ............... H01G 11/40
361/679.01

FOREIGN PATENT DOCUMENTS

| | | | |
|---|---|---|---|
| JP | 2002280059 A | * | 9/2002 |
| JP | 2002289477 A | * | 10/2002 |
| JP | 4942116 B2 | | 5/2012 |

OTHER PUBLICATIONS

George et al.—A Review—Super Capacitor Systems and Its Performance—International Journal of Research in Engineering and Technology, vol. 05 Special Issue: 13 | ICRAES-2016 | Sep. 2016, pp. 1-8 (Year: 2016).*

(Continued)

*Primary Examiner* — Eric W Thomas
(74) *Attorney, Agent, or Firm* — McCoy Russell LLP

(57) ABSTRACT

An electric double-layer capacitor capable of maintaining a low leakage current over a long period of time even in a high temperature range, having high reliability in the high temperature range, and thereby making it possible to extend the life of an apparatus using the electric double-layer capacitor is provided. Further, a method for manufacturing such an electric double-layer capacitor is also provided. An electric double-layer capacitor and its manufacturing method are characterized in that an aqueous electrolytic solution containing a water-soluble electrolyte of which a Hammett acidity function $H_0$ at a temperature of 25° C. is −2.8 or higher and a vapor pressure at a temperature of 100° C. is 400 mmHg or lower is used.

4 Claims, 6 Drawing Sheets

(56) References Cited

OTHER PUBLICATIONS

Jain et al., Synergistic efect of redox couple VO2+/VO2 + with H3PO4 to enhance the supercapacitor performance, Journal of Materials Science: Materials in Electronics (2019) 30:12244-12259 (Year: 2019).*

* cited by examiner

ELECTRIC DOUBLE-LAYER CAPACITOR AND ITS MANUFACTURING METHOD USING AN AQUEOUS ELECTROLYTIC SOLUTION

CROSS REFERENCE TO RELATED APPLICATION

The present application claims priority to Japanese Patent Application No. 2022-127645 filed on Aug. 10, 2022. The entire contents of the above-listed application is hereby incorporated by reference for all purposes.

TECHNICAL FIELD

The present disclosure relates to an electric double-layer capacitor and its manufacturing method.

BACKGROUND

An electric double-layer capacitor is a capacitor in which an electric double layer having a thickness of several nanometers formed at the interface between an electrically charged solid and an electrolytic solution in contact with the solid is used as a dielectric. The degree of the deterioration of the capacitance of such electric double-layer capacitors caused by charging/discharging cycles is small, and as compared to ordinary batteries, it is possible to obtain a large output instantaneously after being started up, so that they are used as backups for IC memories and actuators.

Electric double-layer capacitors can be classified into two types according to the type of the electrolytic solution used, i.e., those that use a non-aqueous (organic) electrolytic solution and those that use an aqueous electrolytic solution. In general, while electric double-layer capacitors using a non-aqueous electrolytic solution have an advantage of having a high withstand voltage, their electrical conductivities tend to be low.

Japanese Patent No. 4942116 discloses an electric double-layer capacitor that uses, as an aqueous electrolytic solution, an electrolytic solution containing sulfuric acid.

SUMMARY

Although an electric double-layer capacitor using sulfuric acid as its electrolytic solution has a high conductivity, it has been difficult, in some cases, to maintain a low leakage current (LC: Leakage Current) value in a high temperature range (e.g., 85 to 105° C.) over a long period of time. Further, sulfuric acid, which is used for the electrolytic solution, is strongly acidic, so its effect on the electrodes and the separator is large, and therefore an apparatus using the electric double-layer capacitor tends to deteriorate rapidly.

The present disclosure has been made in view of the above-described background, and an object thereof is to provide an electric double-layer capacitor capable of maintaining a low leakage current over a long period of time even in a high temperature range, and having high reliability in the high temperature range, thereby making it possible to extend the life of an apparatus using the electric double-layer capacitor. The present disclosure also provides a method for manufacturing such an electric double-layer capacitor.

An electric double-layer capacitor according to an aspect of the present disclosure uses an aqueous electrolytic solution containing a water-soluble electrolyte of which a Hammett acidity function $H_0$ at a temperature of 25° C. is −2.8 or higher and a vapor pressure at a temperature of 100° C. is 400 mmHg or lower.

In the above-described electric double-layer capacitor, a concentration of the water-soluble electrolyte in the aqueous electrolytic solution may be 65 to 77 mass %.

In any of the above-described electric double-layer capacitor, a mass ratio between activated carbon contained in a polarized electrode and the aqueous electrolytic solution may be 1:0.5 to 1:3.

In any of the above-described electric double-layer capacitor, the aqueous electrolytic solution may contain no sulfuric acid.

In a method for manufacturing an electric double-layer capacitor according to an aspect of the present disclosure, when a paste, which comprises a mixture of activated carbon and an electrolytic solution, is applied to a gasket and dried, and a polarized electrode containing the electrolytic solution after the drying is thereby manufactured, the electrolytic solution after the drying is an aqueous electrolytic solution containing a water-soluble electrolyte of which a Hammett acidity function $H_0$ at a temperature of 25° C. is −2.8 or higher and a vapor pressure at a temperature of 100° C. is 400 mmHg or lower, and as conditions for the drying, a temperature is 20 to 30° C. and a relative humidity is 30 to 60%.

In the method for manufacturing an electric double-layer capacitor, a vapor pressure of the water-soluble electrolyte contained in the electrolytic solution before the drying, used for the paste, at a temperature of 20 to 30° C. may be 8 to 20 mmHg.

In any of the above-described method for manufacturing an electric double-layer capacitor, a mass ratio between the activated carbon and the electrolytic solution, contained in the paste before the drying, may be 1:1 to 1:4.

In any of the above-described method for manufacturing an electric double-layer capacitor, a mass ratio between the activated carbon and the electrolytic solution, contained in the polarized electrode, may be 1:0.5 to 1:3.

In any of the above-described method for manufacturing an electric double-layer capacitor, a concentration of the water-soluble electrolyte contained in the electrolytic solution after the drying may be 65 to 77 mass %.

In any of the above-described method for manufacturing an electric double-layer capacitor, the electrolytic solution may contain no sulfuric acid.

According to the present disclosure, it is possible to provide an electric double-layer capacitor capable of maintaining a low leakage current over a long period of time even in a high temperature range, having high reliability in the high temperature range, and thereby making it possible to extend the life of an apparatus using the electric double-layer capacitor, and to provide a method for manufacturing such an electric double-layer capacitor.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

Figure 1:
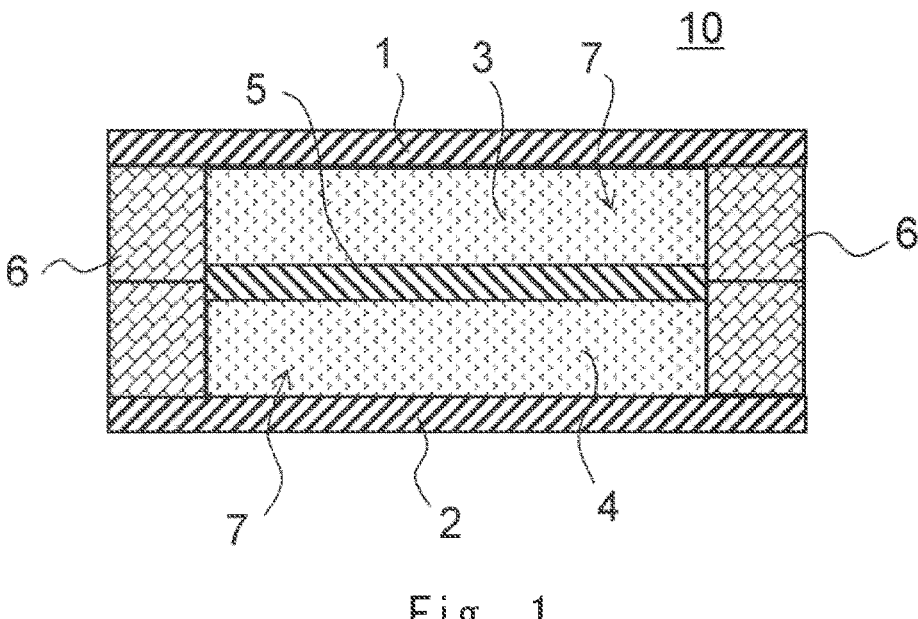
FIG. 1 is a schematic cross-sectional diagram showing an example of a unit cell of an electric double-layer capacitor according to the present disclosure.

Regarding electric double-layer capacitors in which sulfuric acid is used as the electrolytic solution, although a high conductivity is obtained, since sulfuric acid is a strong acid, apparatuses using the electric double-layer capacitors tend to deteriorate rapidly. As a result, in some cases, their long-term quality at a high temperature (e.g., 85 to 105° C.) is not sufficiently ensured. The upper limit of the temperature range in which an ordinary electric double-layer capacitor using a sulfuric-acid electrolytic solution is used is generally 85° C. (Product Life: about 2,000 hours), and the LC value at 85° C. is about 150 times higher than the LC value at a room temperature (25° C.).

In contrast, in an electric double-layer capacitor according to the present disclosure (hereinafter, it is also referred to simply as the present capacitor), an aqueous electrolytic solution containing a water-soluble electrolyte of which the Hammett acidity function $H_0$ at a temperature of 25° C. is −2.8 or higher and the vapor pressure at 100° C. is 400 mmHg or lower is used. In the present capacitor using the aforementioned water-soluble electrolyte, damage to the electrodes, the separator, and the like is small while a proper conductivity is maintained. Further, the evaporation of the electrolytic solution can be properly suppressed even in a high temperature range. As a result, in the present capacitor, it is possible to maintain a low LC value over a long period of time even in a high temperature range (e.g., the product life is 6,000 to 9,000 hours at 85° C.), thereby enabling the present capacitor to be used a super-capacitor of which the quality can be ensured over a long period of time (e.g., 2,000 hours or longer) even in a very high temperature range (e.g., 105° C.).

An example of an embodiment to which the present disclosure is applied will be described hereinafter. The present disclosure is not limited to the below-shown embodiments, and they may be modified as appropriate within the scope and spirit of the disclosure.

Note that a numerical range such as "n-m" or "n to m" (i.e., "from n to m") includes the lower and upper limit values, unless otherwise specified.

<Electric Double-Layer Capacitor>

The present capacitor can include a pair of polarized electrodes and an aqueous electrolytic solution. In the present capacitor, the aqueous electrolytic solution may exist in a state of being impregnated in the component parts forming the polarizable electrode. Note that, in the present capacitor, an aqueous electrolytic solution containing a water-soluble electrolyte of which the Hammett acidity function $H_0$ at a temperature of 25° C. is −2.8 or higher and the vapor pressure at a temperature of 100° C. is 400 mmHg or lower is used. Note that the "water-soluble electrolyte" in this specification may mean one that contains a solvent (e.g., water) or one that contains no solvent. For example, when phosphoric acid (which will be described later) is used as the electrolyte, the "water-soluble electrolyte" may be phosphoric acid having a concentration of 100 mass %, or may mean a phosphoric acid aqueous solution having a specific concentration.

The Hammett acidity function $H_0$ is a numerical value quantitatively representing the strength of the acidity of a medium such as a solution, proposed by Louis Hammett. Note that the Hammett acidity function is a numerical value specific to the type, the composition, and the concentration of the target solution, and changes according to the temperature. The higher the value of the Hammett acidity function $H_0$ is in the negative direction (i.e., the lower the value of the Hammett acidity function $H_0$ is), the more acidic the medium is. That is, in the present capacitor, when a solvent such as water is used in the aqueous electrolytic solution, the "Hammett acidity function $H_0$ at a temperature of 25° C." of the "water-soluble electrolyte" can be the value of the water-soluble electrolyte dissolved in this solvent (e.g., the water-soluble electrolyte solution (e.g., a phosphoric acid aqueous solution)).

When the Hammett acidity function $H_0$ at a temperature of 25° C. of the water-soluble electrolyte is −2.8 or higher, it has a proper acidity and hence the damage to components such as electrodes can be reduced. Further, since the water-soluble electrolyte having the Hammett acidity function $H_0$ of −2.8 or higher has proper reactivity, the decrease in the liquid volume caused by the decomposition of the electrolytic solution can be suppressed. Further, in view of the reactivity and the high-temperature reliability, the Hammett acidity function $H_0$ of the water-soluble electrolyte at a temperature of 25° C. is preferably −2.5 or higher and more preferably −2.2 or higher from. Further, in view of the conductivity, the Hammett acidity function $H_0$ of the water-soluble electrolyte at a temperature of 25° C. is preferably 0 or lower and more preferably −1.0 or lower.

Note that the concentration of sulfuric acid in a typical sulfuric-acid electrolytic solution used in an electric double-layer capacitor is 45 to 60 mass %, and in such a case, the Hammett acidity function $H_0$ at a temperature of 25° C. is −4.46 to −2.85. Therefore, a sulfuric acid aqueous solution conventionally used in an electric double-layer capacitor is more acidic than the aqueous electrolytic solution containing the water-soluble electrolyte used in the present capacitor.

The Hammett acidity function $H_0$ of the water-soluble electrolyte at a temperature of 25° C. can be measured by the following method. That is, a small amount of nitroaniline-based neutral base (B) (e.g., p-nitroaniline) of which the dissociation constant is known is added to a measurement-target (i.e., an acid solution (HA) of which it is desired to measure the acidity function), and the ratio between the concentrations of protonated substance and non-protonated substance in the solution is obtained based on the integrated value of an NMR spectrum or by absorption spectrophotometry, so that the Hammett acidity function $H_0$ is calculated by the below-shown formula.

$$H_0 = pK_{BH+} - \log[BH^+]/[B]$$

In the formula, $pK_{BH+}$ represents the acid dissociation constant of $BH^+$ (protonated ($H^+$) base B), and $[BH^+]$ represents the molar concentration of $BH^+$. Further, $[B]$ represents the molar concentration of the base B.

Note that when the Hammett acidity function $H_0$ of the water-soluble electrolyte contained in the electrolytic solution included in the electric double-layer capacitor at a temperature of 25° C. is measured, firstly, the electrolytic solution included in the electric double-layer capacitor is identified. Then, the above-described Hammett acidity function $H_0$ of the water-soluble electrolyte is specified based on the concentration and the composition ratio of the identified water-soluble electrolyte.

Further, when the vapor pressure of the water-soluble electrolyte at a temperature of 100° C. is 400 mmHg or lower, the evaporation of the electrolytic solution at a high temperature can be properly suppressed. Further, in order to suppress the evaporation of the electrolytic solution, the vapor pressure at 100° C. is preferably 370 mmHg or lower, and more preferably 350 mmHg or lower. The lower the vapor pressure of the water-soluble electrolyte at a temperature of 100° C. is, the more it is advantageous for the characteristics of the product. However, the vapor pressure of the water-soluble electrolyte at a temperature of 100° C. is preferably 50 mmHg or higher. When the vapor pressure of the water-soluble electrolyte at a temperature of 100° C. is 50 mmHg or higher, it is easy to properly maintain the concentration of the water-soluble electrolyte of the aqueous electrolytic solution during the manufacturing, and also easy to properly maintain the viscosity of the aqueous electrolytic solution in the manufacturing environment (temperature: 20 to 30° C.). As a result, it is possible to easily perform squeezing of the prepared electrode paste, thus making the manufacturing easier. For a similar reason, the vapor pressure of the water-soluble electrolyte at 100° C. is more preferably 100 mmHg or higher.

The vapor pressure of the water-soluble electrolyte at a temperature of 100° C. can be measured by a static method. Specifically, a sample is encapsulated in a container equipped with a pressure gauge, and the inside of the container is sufficiently evacuated, so that only the sample and its vapor are left in the container. Then, the container is placed undisturbed in a thermostatic bath at 100° C., and the pressure of the vapor in that state is measured. Note that when a solvent such as water is used in the aqueous electrolytic solution in the present capacitor, the "vapor pressure at a temperature of 100° C." of the "water-soluble electrolyte" can be the value of the water-soluble electrolyte dissolved in this solvent (e.g., the water-soluble electrolyte solution (e.g., a phosphoric acid aqueous solution)).

Examples of water-soluble electrolytes of which the Hammett acidity function $H_0$ at 25° C. is −2.8 or higher and the vapor pressure at 100° C. is 400 mmHg or lower include acetic acid, boric acid, phosphoric acid, oxalic acid, butyric acid, and dichloroacetic acid. Any substance other than these acids can be used without restriction as long as it satisfies the above-described conditions for the acidity function and the vapor pressure. However, among the aforementioned substances, in view of the conductivity and the above-described easiness of the manufacturing, it is preferred to use, as the water-soluble electrolyte, an acid selected from acetic acid, oxalic acid, and phosphoric acid. Further, for a similar reason, it is particularly preferred to use phosphoric acid as the water-soluble electrolyte.

Note that the concentration of each water-soluble electrolyte (the concentration in the aqueous electrolytic solution contained in the present capacitor) can be set as appropriate under the above-described conditions, i.e., within the range in which the Hammett acidity function $H_0$ at 25° C. is −2.8 or higher and the vapor pressure at 100° C. is 400 mmHg or lower.

For example, in order to adjust the Hammett acidity function $H_0$ to −2.8 or higher, the concentration of phosphoric acid in the aqueous electrolytic solution is preferably 77 mass % or lower. Further, from the viewpoint of electrical conductivity, the concentration of phosphoric acid is more preferably 75 mass % or lower. Further, in order to adjust the vapor pressure at 100° C. to 400 mmHg or lower, the concentration of phosphoric acid is preferably 65 mass % or higher. Further, in order to suppress the evaporation of the electrolytic solution, the concentration of phosphoric acid is more preferably 70 mass % or higher.

For example, since the freezing point of a phosphoric acid aqueous solution having a concentration of 65 to 75 mass % is −20° C. or lower, it can be used without being frozen even at a low temperature of −20° C. or lower, thus making it possible to provide an electric double-layer capacitor that can be used in a wide range of environments from a high-temperature environment to a low-temperature environment.

In the present capacitor, only one type of water-soluble electrolyte may be used or a plurality of types of water-soluble electrolytes may be used in combination. However, when a plurality of types of water-soluble electrolytes are used, they are prepared so that the properties of the whole water-soluble electrolytes (e.g., the properties of the whole aqueous electrolytic solution) satisfy the above-described conditions for the Hammett acidity function $H_0$ and the vapor pressure.

In addition to the above-described water-soluble electrolyte and water or the like, which serves as the solvent for the electrolyte, the aqueous electrolytic solution may contain other components in the range in which the effects of the present disclosure can be obtained. Examples of other components include water-soluble organic solvents such as glycerin, butanediol, ethylene glycol, diethylene glycol, triethylene glycol, polyethylene glycol, propylene glycol, polyvinyl alcohol, and sulfolane.

Note that when other components are contained in the aqueous electrolytic solution, it is preferred that the whole aqueous electrolytic solution satisfies the above-described various conditions such as conditions for the Hammett acidity function $H_0$ and the vapor pressure at 100° C. Further, the aqueous electrolytic solution may be composed of an aqueous solution of the above-described water-soluble electrolyte.

Note that since the present capacitor has been invented in order to solve the problem in regard to electric double-layer capacitors using a sulfuric-acid electrolytic solution, the aqueous electrolytic solution preferably contains no sulfuric acid in order to make the present capacitor exhibit more excellent effects.

As described above, the present capacitor can include a pair of polarized electrodes in addition to the above-described aqueous electrolytic solution. The present capacitor may have, for example, a unit cell 10 as shown in FIG. 1. The unit cell 10 includes a positive electrode current collector 1, a polarized electrode 3, which is disposed as a positive electrode above the positive electrode current collector 1, a negative electrode current collector 2, and a polarized electrode 4, which is disposed as a negative electrode above the negative electrode current collector 2. The polarized electrodes 3 and 4 corresponds to a part that forms an electric double layer. Note that FIG. 1 is a schematic cross-sectional diagram showing an example of a unit cell of an electric double-layer capacitor according to the present disclosure.

Note that although the capacitance of an electric double-layer capacitor is several tens of ∞F per cm², it is possible to obtain an extremely large capacitance on the order of several hundreds to several thousands of F by using activated carbon having a surface area of several thousands of m² as the main component of the electrode(s). Note that the main component refers to, in a given object (the electrode in this example), a component that is contained in the largest quantity among all the components contained therein. Therefore, although the material for the polarized electrodes included in the present capacitor can be selected as appropriate from known materials, it is preferred that at least one of the pair of polarized electrodes (e.g., the positive electrode) or both of them contain activated carbon. Embodiments of the present capacitor will be shown hereinafter, but the present disclosure is not limited to the below-shown embodiments.

Each of the polarized electrodes 3 and 4 contains an activated carbon powder and is in the form of a paste as an aqueous electrolytic solution is mixed therein. Examples of usable activated carbon include a synthetic resin-based activated carbon such as phenol, rayon, acrylic and polyvinyl chloride; natural material-based activated carbon such as coconut shell and hardwood; coal/petroleum-based activated carbon such as pitch and coke. Among them, phenol resin-based activated carbon, coconut-shell activated carbon, or petroleum coke-based activated carbon can be suitably used as the activated carbon.

Note that in the present capacitor, in view of the capacitance per volume, the mass ratio between the activated carbon contained in the polarized electrode(s) and the aqueous electrolytic solution (one containing a solute (e.g., phosphoric acid) and a solvent (e.g., water)) is preferably 1:0.5 to 1:3. Note that the mixing ratio of activated carbon can be selected as appropriate according to the shape and the grain size of the used activated carbon.

In the electric double-layer capacitor shown in FIG. 1, the positive polarized electrode 3 and the negative polarized electrode 4 are arranged so as to be opposed to each other with a separator 5 interposed therebetween. The separator 5 is made of polypropylene nonwoven fabric, polyethylene nonwoven fabric, polypropylene microporous membrane, or the like, and can prevent the polarized electrodes 3 and 4 from being short-circuited each other.

The positive and negative electrode current collectors 1 and 2 are larger than the polarized electrodes 3 and 4 in a plan view, and have frame areas with respect to the polarized electrodes 3 and 4 in the plan view. Insulating gaskets 6 (electrode gaskets) are disposed on the outer edges, i.e., in the frame areas of the positive and negative electrode current collectors 1 and 2. That is, the gaskets 6 are disposed on the outer edges of the polarized electrodes 3 and 4 and the separator 5, and the positive and negative electrode current collectors 1 and 2 are arranged so as to be opposed to each other with the gaskets 6, the polarized electrodes 3 and 4, and the separator 5 interposed therebetween. By the gaskets 6, the positive and negative electrode current collectors 1 and 2 can be prevented from being short-circuited each other.

The positive and negative electrode current collectors 1 and 2, and the gaskets 6 can be selected as appropriate in consideration of the resistance to the aqueous electrolytic solution, the conductivity, the non-conductivity, and the like. For example, conductive butyl rubber can be used for the positive and negative electrode current collectors 1 and 2, and insulating butyl rubber can be used for the gaskets 6. The unit cell 10 has a sealed structure (i.e., a hermetically-enclosed structure) by the gaskets 6, and the positive and negative electrode current collectors 1 and 2, so that it is possible to prevent the aqueous electrolytic solution contained inside (filled in) the container from leaking to the outside.

The unit cell 10 is typically housed in a container formed of an outer sheath (exterior body) (not shown). The positive electrode current collector 1 is connected to a positive electrode tab (not shown) and the negative electrode current collector 2 is connected to a negative electrode tab (not shown). Further, these tabs are lead (e.g., wired) to the outside of the container. That is, the positive and negative electrode current collectors 1 and 2 can serve as a medium for electrically connecting a component or the like disposed outside the cell to the polarized electrodes 3 and 4.

The aqueous electrolytic solution 7 is an electrically-conductive solution containing a water-soluble electrolyte that satisfies the above-described conditions, and can impregnate (i.e., penetrate) into the polarized electrodes 3 and 4 as a paste mixed with an activated carbon powder and also impregnate (i.e., penetrate) into the separator 5. An electric double layer is formed by the aqueous electrolytic solution 7 and the polarized electrodes 3 and 4.

The electric double-layer capacitor may have a structure in which a plurality of unit cells are stacked on top of each other. The unit cell 10 (i.e., each of unit cells 10) can have various shapes such as a box-shape, a cylindrical shape, and a sheet-like shape.

<Method for Manufacturing Electric Double-Layer Capacitor>

In a method for manufacturing an electric double-layer capacitor (a capacitor element) according to the present disclosure (hereafter also referred to simply as the present manufacturing method), when a paste comprised a mixture of activated carbon and an electrolytic solution is applied to gaskets and dried, and polarized electrodes containing the electrolytic solution after the drying are thereby manufactured, the following conditions are satisfied. That is, the electrolytic solution after the drying should be an aqueous electrolytic solution containing a water-soluble electrolyte of which a Hammett acidity function $H_0$ at a temperature of 25° C. is −2.8 or higher and a vapor pressure at a temperature of 100° C. is 400 mmHg or lower. Further, as the conditions for the drying, a temperature should be 20 to 30° C. and a relative humidity should be 30 to 60%. Note that even when the present manufacturing method is not used, any manufacturing method by which the above-described capacitor can be manufactured can be used as appropriate. Specifically, in the manufacturing method according to the present disclosure, a paste method in which a paste, of which the mixing ratio of an electrolytic solution is excessively higher than those for ordinary pastes in order to make the paste have fluidity, is prepared and applied to (e.g., rubbed into) gaskets, and then the amount and the concentration of the remaining (final) electrolytic solution are adjusted by vapor-liquid equilibrium (specifically, by evaporating the electrolytic solution) is used. However, a method in which dried electrodes and an electrolytic solution are separately prepared, and the electrolytic solution is dropped onto the electrodes (or other components) can also be used in order to obtain the present capacitor.

More specifically, the manufacturing method according to the present disclosure can include the following steps.

A step of preparing an electrolytic solution (hereinafter also referred to as a raw-material electrolytic solution) (Electrolyte Solution Preparation Step).

A step of preparing gaskets (Gasket Preparation Step).

A step of preparing a paste (electrode paste) by mixing activated carbon with the electrolytic solution (raw-material electrolytic solution) (Paste Preparation Step).

A step of performing squeezing of the paste onto gaskets (Squeezing Step).

A step of drying the paste, which has been subjected to the squeezing, and thereby obtaining a unit cell (Drying Step).

A step of manufacturing an electric double-layer capacitor by using the obtained unit cell (Capacitor Manufacturing Step).

These steps may be performed one after another, or a plurality of steps (e.g., the electrolytic solution preparation step and the gasket preparation stop) may be performed in parallel. Further, these steps may be performed a plurality of times.

These steps will be described hereinafter in detail.

Firstly, an aqueous electrolytic solution (e.g., a phosphoric acid aqueous solution) containing a water-soluble electrolyte (e.g., phosphoric acid) at a predetermined concentration is prepared (Electrolyte Solution Preparation Step). There is no particular restriction on this raw-material electrolytic solution as long as the above-described Hammett acidity function of the electrolytic solution that has already undergone the heating process (the drying step) and the vapor pressure thereof at a temperature of 100° C. satisfy the above-described conditions. That is, the water-soluble electrolyte and its concentration and the like can be set as desired. That is, the Hammett acidity function $H_0$ of the raw-material electrolytic solution (the water-soluble electrolyte) at a temperature of 25° C. may be −2.8 or higher, or may not be −2.8 or higher. Further, the vapor pressure of the raw-material electrolytic solution (the water-soluble electrolyte) at a temperature of 100° C. may be 400 mmHg or lower, or may not be 400 mmHg or lower. However, in order to make it possible to manufacture a more stable paste electrode and to properly perform the drying step (which will be described later), the vapor pressure of the raw-material electrolytic solution (the electrolytic solution before the drying step) at a temperature of 20 to 30° C. (a temperature in the manufacturing environment (i.e., a room temperature)) is preferably 8 to 20 mmHg. More specifically, when the vapor pressure of the raw-material electrolytic solution (the water-soluble electrolyte) at the aforementioned temperature is 8 mmHg or higher, the amount of moisture absorbed from the paste during the drying step can be easily controlled within an appropriate range, and the mass ratio between the activated carbon and the electrolytic solution in the paste can be easily controlled within an appropriate range. Further, when the vapor pressure of the raw-material electrolytic solution (the water-soluble electrolyte) at the aforementioned temperature is 20 mmHg or lower, the amount of evaporation of the electrolytic solution can be easily controlled within an appropriate range, and the mass ratio between the activated carbon and the electrolytic solution in the paste can be easily controlled within an appropriate range.

For example, in view of the workability during the formation of the electrodes, the vapor pressure of the water-soluble electrolyte (or the water-soluble electrolyte solution when the aqueous electrolytic solution contains the solvent) at a temperature of 25° C. can be adjusted to a range of no higher than 15 mmHg and no lower than 10 mmHg.

Next, the activated carbon and the above-described raw-material electrolytic solution are mixed into a paste, so that an electrode paste is prepared (Paste Preparation Step). The mass ratio between the activated carbon and the raw-material electrolytic solution (one containing a solute (e.g., phosphoric acid) and a solvent (e.g., water)), which are mixed into the paste, is adjusted as appropriate according to the shape, the specific surface area, the type, and the like of the activated carbon. However, in view of the capacitance per volume, the mass ratio between the activated carbon and the raw-material electrolytic solution in the paste before the drying is preferably 1:1 to 1:4.

Next, for example, hollow circular gaskets 6 are prepared (Gasket Preparation Step). Then, the gaskets 6 and disk-shaped positive and negative electrode current collectors 1 and 2 are respectively bonded together, and a PE (polyethylene) or PET (polyethylene terephthalate) sheet or the like with punched holes formed therein, which have the same diameter as that of the gaskets 6, is bonded onto the gaskets 6. Further, they are masked so that the electrode paste does not adhere to (i.e., is not deposited on) the surfaces of the gaskets 6. Then, the above-described electrode paste is dropped onto the gaskets 6, and squeezing is performed so that the amount of the applied electrode paste is uniformly spread (Squeezing Step). After the above-described electrode paste is applied, the bonded PE/PET sheet is removed. Then, the moisture contained in the raw-material electrolytic solution is dried (i.e., is made to evaporate), so that one side of a unit cell is formed (Drying Step).

When doing so, the electrode paste is dried at a temperature of 20 to 30° C. (a room temperature) and a relative humidity of 30 to 60% RH until it becomes an equilibrium state. The concentration of the electrolytic solution can be easily controlled in a stable manner by drying the electrode past under the above-described conditions until it becomes an equilibrium state. When doing so, the concentration of the water-soluble electrolyte in the dried electrolytic solution is preferably 65 to 77 mass % as described above. Further, as described above, the mass ratio between the activated carbon contained in the polarized electrodes and the electrolytic solution is preferably 1:0.5 to 1:3. Further, in the manufacturing method according to the present disclosure, the electrolytic solution preferably contains no sulfuric acid in order to achieve the effects of the present disclosure more effectively.

The other side of the unit cell is prepared in a similar manner. Then, they are arranged so as to be opposed to each other with the separator 5 interposed therebetween, so that the polarized electrodes 3 and 4 containing the aqueous electrolytic solution 7 are sealed (i.e., hermetically enclosed). When they are sealed, the internal air is removed and the pressure is thereby reduced to 100 Pa or lower, so that vacuum bonding is performed. The sealed unit cell is pressurized to about 6 kg/cm$^{-2}$ and vulcanized at 120° C. for 30 to 60 minutes, so that its bonding parts are made to adhere together (or are bonded together). A unit cell 10 can be manufactured through the above-described series of processes. An electric double-layer capacitor is manufactured by, if necessary, staking a plurality of unit cells 10 on top of each other (Capacitor Manufacturing Step).

The electric double-layer capacitor can have a capacitance as ions in the aqueous electrolytic solution are physically absorbed by the polarized electrodes during the charging/discharging.

EXAMPLES

The present disclosure will be described in a concrete manner by using examples and comparison examples. Note that the present disclosure should not be limited by the following descriptions.

Example 1

An electric double-layer capacitor containing, as the water-soluble electrolyte, an aqueous electrolytic solution (phosphoric acid aqueous solution) containing phosphoric acid (PA) at a concentration of 70 mass % (a concentration after the drying step) was manufactured according to the following procedure. Note that the Hammett acidity function $H_0$ of the phosphoric acid aqueous solution (aqueous water-soluble electrolytic solution) at a temperature of 25° C. after the drying step was −2.29, and the vapor pressure at a temperature of 100° C. after the drying step was 340 mmHg. Further, the vapor pressure of the phosphoric acid aqueous solution before the drying step, i.e., the vapor pressure of the raw-material electrolytic solution at a temperature of 25° C. when the paste was prepared, was 8.5 mmHg. Further, the mass ratio between the activated carbon and the raw-material electrolytic solution when the paste was prepared was 1:1.5. Further, the mass ratio between the activated carbon and the electrolytic solution, contained in the polarized electrodes after the drying step, was 1:1.3. The operations in the manufacturing process will be described hereinafter in a more detailed manner.

Firstly, an aqueous solution of phosphoric acid having a concentration of 60 mass % was added to phenol resin-based activated carbon having a grain size of 4 to 14 μm, and the mixture was sufficiently kneaded into a paste. Next, a sheet (electrode coating part: 0.5 mm thick, 6.6 mm diameter) composed of a gasket made of non-conductive butyl rubber and a current collector made of conductive butyl rubber was prepared, and the electrode was produced by applying the paste to the electrode formation part of the sheet and drying the applied paste. When doing so, in order to properly dry the paste, the drying conditions were set to satisfy a temperature of 20 to 30° C. and a relative humidity of 30 to 60% RH. Next, a pair of sheets on each of which an electrode was formed as described above were prepared, and they were placed on each other with a porous separator interposed therebetween. The porous separator was made of polytetrafluoroethylene, has a thickness of 0.05 mm and a diameter of 8.0 mm, and has a porosity of 55%.

Figure 2:
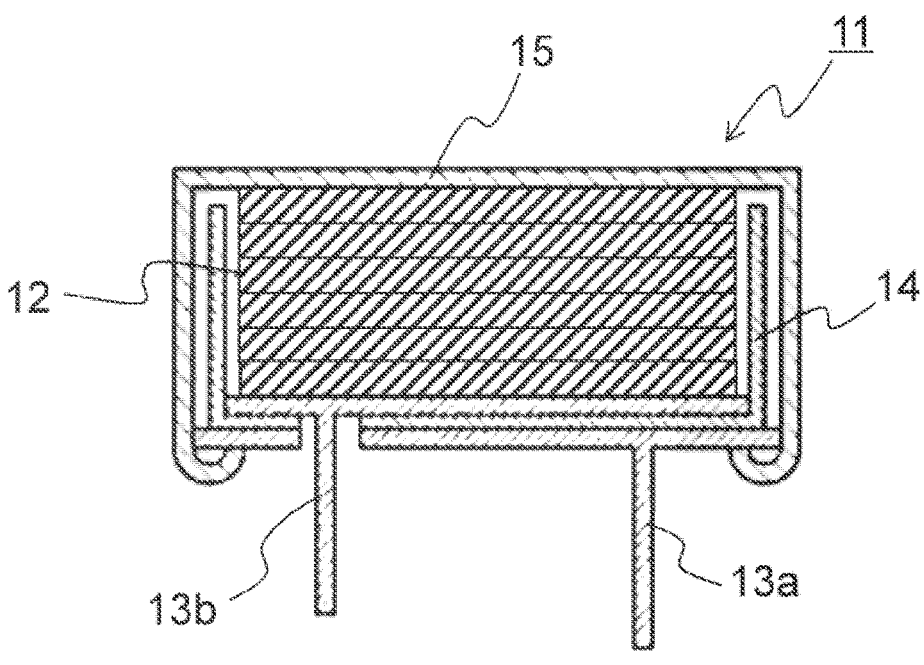
FIG. 2 is a schematic cross-sectional diagram showing an embodiment of an electric double-layer capacitor according to the present disclosure.

Next, a unit cell sheet was manufactured by accelerating the vulcanization of butyl rubber by thermocompression bonding, and thereby sealing (i.e., hermetically enclosing) the gaskets made of non-conductive butyl rubber together, and sealing the gaskets made of non-conductive butyl rubber and the current collectors made of conductive butyl rubber. Further, a unit cell stack was manufactured by stacking six unit cell sheets, each of which was manufactured as described above, on top of each other. An electric double-layer capacitor 11 having a structure shown in FIG. 2 was manufactured by using the unit cell stack. The current collector on the lower side of the unit cell stack 12 shown in FIG. 2 was directly connected to a connecting terminal 13*b*, and the current collector on the upper side in FIG. 2 was connected to a connecting terminal 13*a*. The connecting terminal 13*a* was in contact with the bottom of a bottomed cylindrical case 15 made of a metal such as stainless steel, and the edge of its opening was bent and crimped inward so as to be positioned with an insulator 14 interposed therebetween.

Comparison Example 1

An electric double-layer capacitor was manufactured in a manner similar to that for Example 1, except that an aqueous electrolytic solution (sulfuric acid aqueous solution) containing sulfuric acid (SA) at a concentration of 50 mass % (the concentration after the drying step) was used as the water-soluble electrolyte. Note that the Hammett acidity function $H_0$ of the sulfuric acid aqueous solution at 25° C. after the drying step was −3.38, and the vapor pressure at 100° C. was 325 mmHg.

[Leakage Current]

Figure 5:
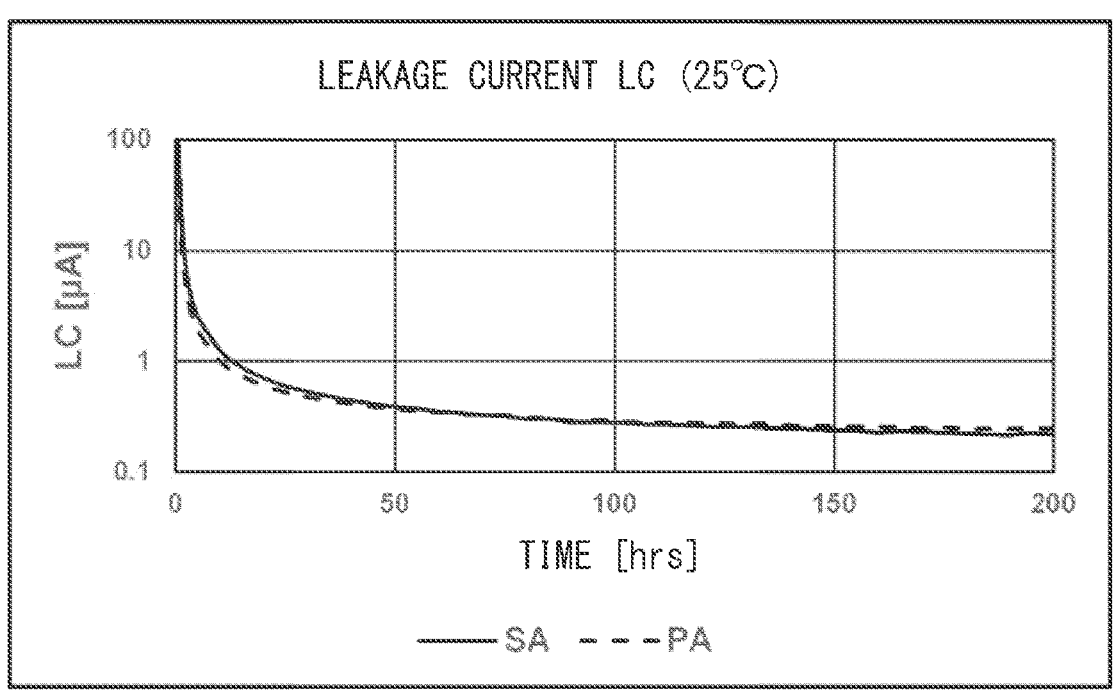
FIG. 5 is a graph showing examples of temporal changes in a leakage current (LC) in an electric double-layer capacitor at a temperature of 25° C. when sulfuric acid and phosphoric acid were used as a water-soluble electrolyte, respectively.
Figure 6:
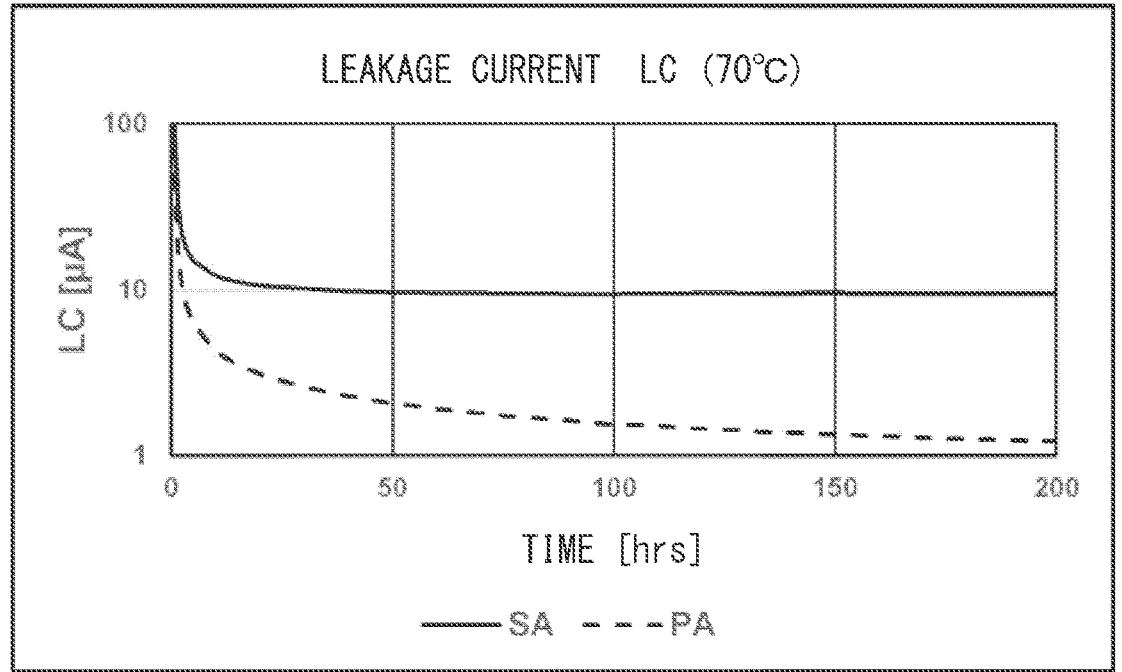
FIG. 6 is a graph showing examples of temporal changes in a leakage current (LC) in an electric double-layer capacitor at a temperature of 70° C. when sulfuric acid and phosphoric acid were used as a water-soluble electrolyte, respectively.
Figure 7:
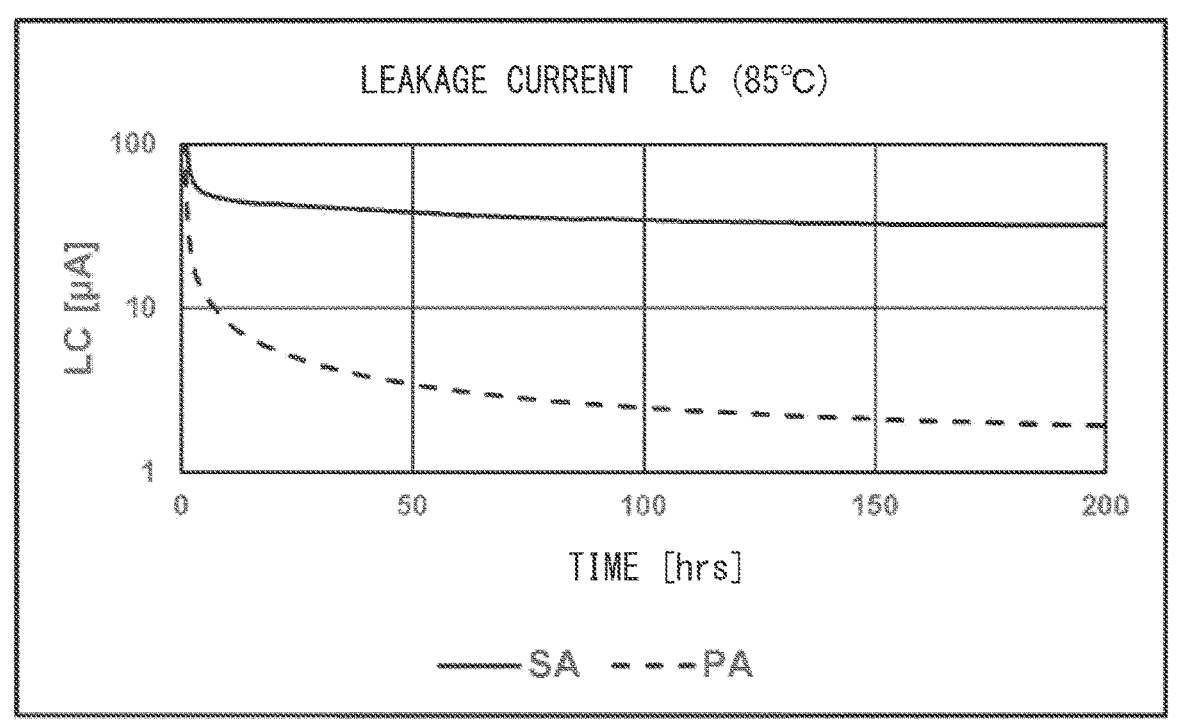
FIG. 7 is a graph showing examples of temporal changes in a leakage current (LC) in an electric double-layer capacitor at a temperature of 85° C. when sulfuric acid and phosphoric acid were used as a water-soluble electrolyte, respectively.

Tables 1 to 3 show the results of the temporal changes (i.e., changes over time) of a leakage current (LC) of each of the electric double-layer capacitors obtained in the respective examples at temperatures (25° C., 70° C. and 85° C.), and FIGS. 5 to 7 show graphs based on these results.

Figure 3:
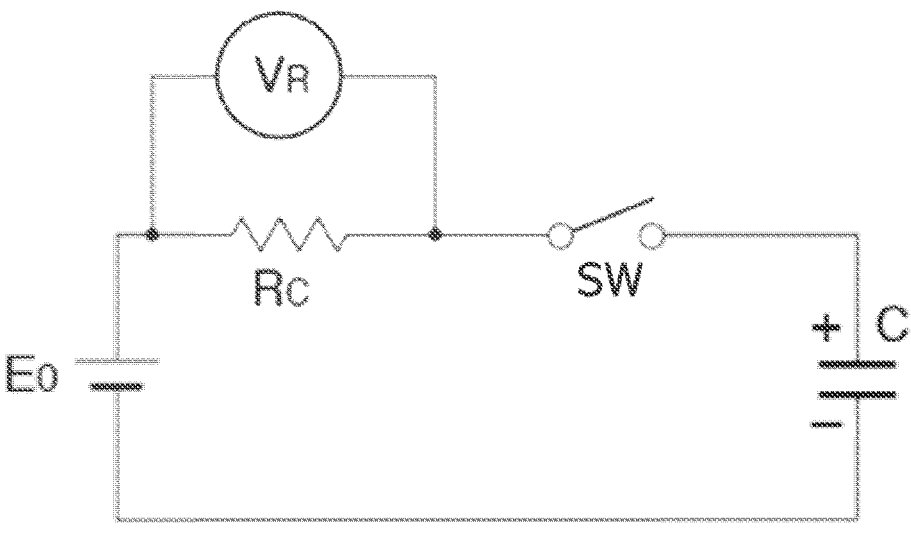
FIG. 3 is a schematic diagram of a circuit that is used when a leakage current is measured.

Note that the LC of each electric double-layer capacitor at each temperature was measured by the following method. That is, in a circuit shown in FIG. 3, a rated voltage $E_0$ was applied to the electric double-layer capacitor C by turning on the switch SW, and a voltage VR between both ends of the series-connected resistance Rc was measured. Then, a leakage current was calculated by the below-shown formula.

$$Current: I = V_R/R_c$$

In the formula, I represents the leakage current [A]; $V_R$ represents the voltage [V] across the resistance; and $R_c$ represents the resistance (Ω).

TABLE 1

| | LC (25° C.) | |
| --- | --- | --- |
| | LC(μA) | |
| Time [hrs] | Sulfuric Acid (SA) | Phosphoric Acid (PA) |
| 0.05 | 687.365 | 686.802 |
| 0.1 | 515.779 | 509.080 |
| 0.15 | 404.747 | 391.620 |
| 0.2 | 326.635 | 308.596 |
| 0.25 | 268.613 | 247.103 |
| 0.3 | 223.820 | 199.712 |
| 0.35 | 188.279 | 162.708 |

TABLE 1-continued

| | LC (25° C.) | |
|---|---|---|
| | LC(µA) | |
| Time [hrs] | Sulfuric Acid (SA) | Phosphoric Acid (PA) |
| 0.4 | 159.556 | 133.205 |
| 0.5 | 116.532 | 90.761 |
| 0.6 | 86.848 | 63.498 |
| 0.7 | 66.001 | 45.812 |
| 0.8 | 51.163 | 34.141 |
| 0.9 | 40.465 | 26.285 |
| 1 | 32.615 | 20.847 |
| 2 | 8.640 | 5.810 |
| 3 | 4.713 | 3.351 |
| 5 | 2.528 | 1.903 |
| 10 | 1.258 | 1.012 |
| 20 | 0.706 | 0.608 |
| 40 | 0.442 | 0.411 |
| 60 | 0.351 | 0.344 |
| 80 | 0.303 | 0.308 |
| 100 | 0.279 | 0.288 |
| 120 | 0.257 | 0.273 |
| 140 | 0.246 | 0.261 |
| 160 | 0.227 | 0.251 |
| 180 | 0.222 | 0.245 |
| 200 | 0.217 | 0.243 |

TABLE 2

| | LC (70° C.) | |
|---|---|---|
| | LC(µA) | |
| Time [hrs] | Sulfuric Acid (SA) | Phosphoric Acid (PA) |
| 0.05 | 715.440 | 704.200 |
| 0.1 | 561.407 | 539.768 |
| 0.15 | 459.417 | 429.745 |
| 0.2 | 385.250 | 349.687 |
| 0.25 | 327.724 | 288.041 |
| 0.3 | 281.575 | 238.868 |
| 0.35 | 243.671 | 198.837 |
| 0.4 | 212.007 | 166.294 |
| 0.5 | 162.948 | 118.204 |
| 0.6 | 127.626 | 86.343 |
| 0.7 | 102.006 | 65.149 |
| 0.8 | 83.413 | 50.930 |
| 0.9 | 69.634 | 41.048 |
| 1 | 59.269 | 33.997 |
| 2 | 25.393 | 12.900 |
| 3 | 18.970 | 8.915 |
| 5 | 14.986 | 6.274 |
| 10 | 12.219 | 4.324 |
| 20 | 10.660 | 3.120 |
| 40 | 9.856 | 2.286 |
| 60 | 9.603 | 1.916 |
| 80 | 9.497 | 1.702 |
| 100 | 9.445 | 1.542 |
| 120 | 9.578 | 1.453 |
| 140 | 9.485 | 1.377 |
| 160 | 9.482 | 1.308 |
| 180 | 9.486 | 1.257 |
| 200 | 9.522 | 1.218 |

TABLE 3

| | LC (85° C.) | |
|---|---|---|
| | LC(µA) | |
| Time [hrs] | Sulfuric Acid (SA) | Phosphoric Acid (PA) |
| 0.05 | 725.676 | 716.043 |
| 0.1 | 578.973 | 557.837 |
| 0.15 | 482.192 | 451.956 |
| 0.2 | 411.748 | 374.058 |
| 0.25 | 357.207 | 313.270 |
| 0.3 | 313.469 | 264.193 |
| 0.35 | 277.155 | 223.884 |
| 0.4 | 246.514 | 190.577 |
| 0.5 | 198.992 | 140.471 |
| 0.6 | 165.130 | 106.517 |
| 0.7 | 140.808 | 83.491 |
| 0.8 | 123.009 | 67.567 |
| 0.9 | 109.796 | 56.332 |
| 1 | 99.623 | 48.053 |
| 2 | 64.461 | 22.035 |
| 3 | 56.316 | 16.321 |
| 5 | 50.336 | 11.997 |
| 10 | 45.961 | 8.214 |
| 20 | 43.308 | 5.637 |
| 40 | 40.056 | 3.876 |
| 60 | 37.309 | 3.148 |
| 80 | 35.453 | 2.742 |
| 100 | 34.589 | 2.492 |
| 120 | 33.771 | 2.309 |
| 140 | 33.060 | 2.173 |
| 160 | 32.512 | 2.076 |
| 180 | 32.232 | 1.993 |
| 200 | 32.177 | 1.937 |

[Capacitance]

Figure 8:
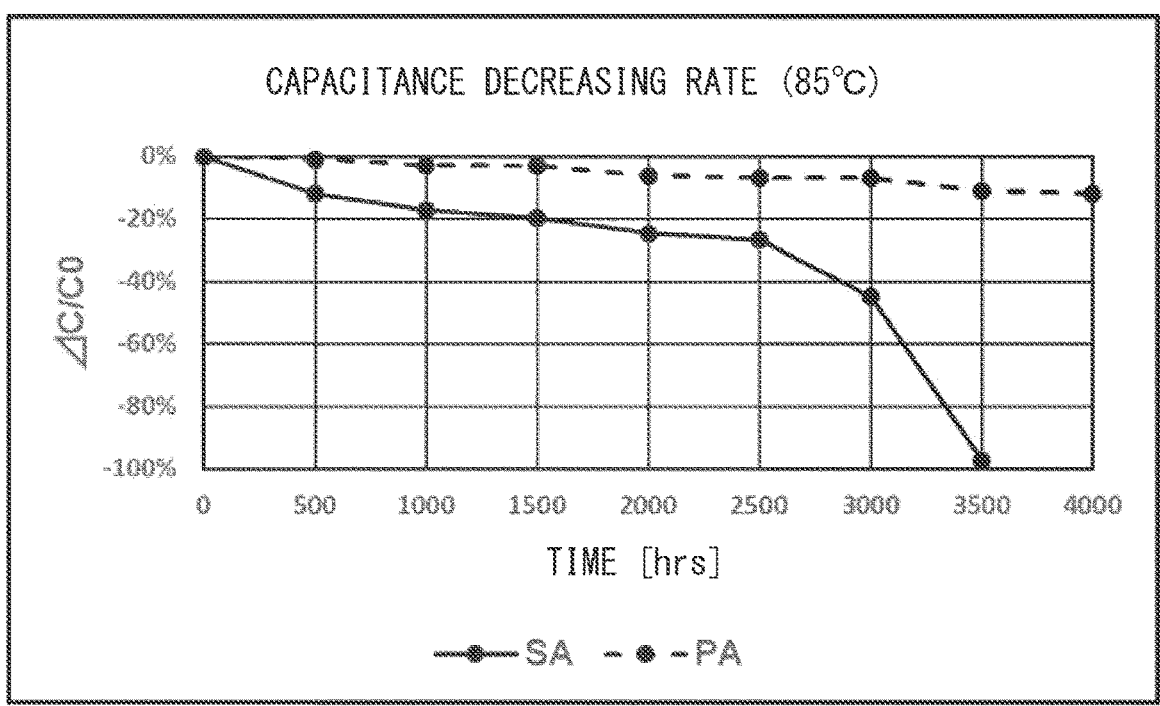
FIG. 8 is a graph showing examples of temporal changes in the rate at which the capacitance of an electric double-layer capacitor decreases at a potential difference of 5.5 V at a temperature of 85° C. when sulfuric acid and phosphoric acid were used as a water-soluble electrolyte, respectively.
Figure 9:
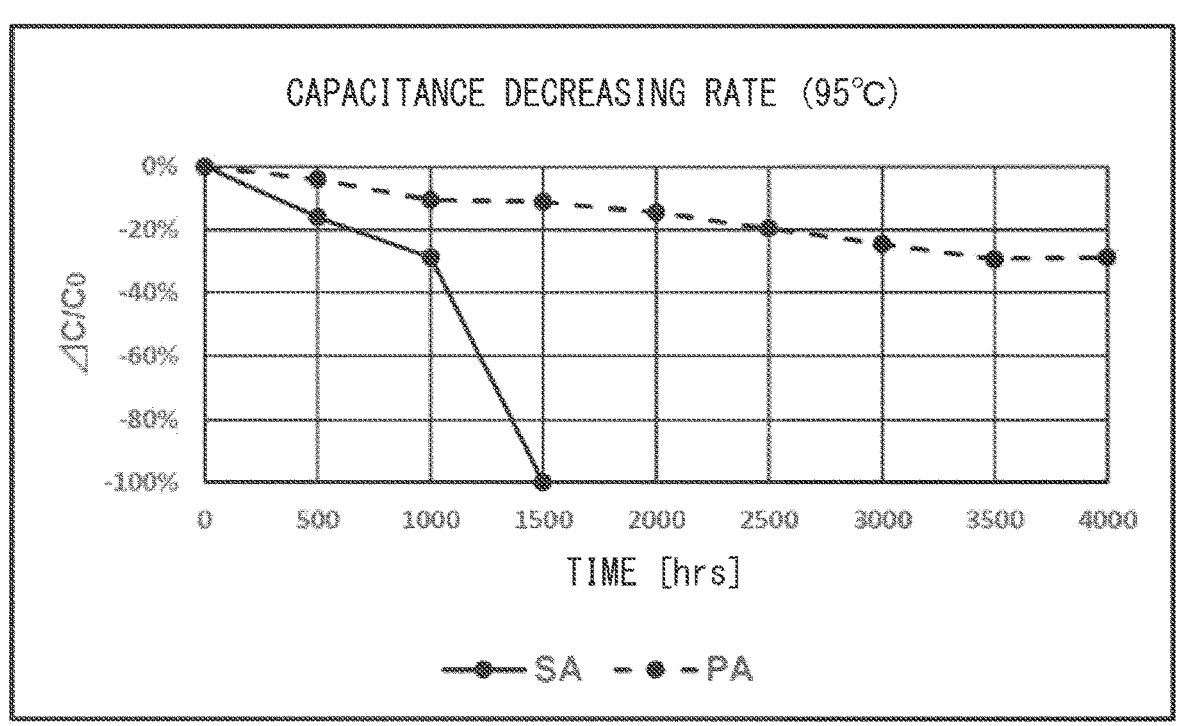
FIG. 9 is a graph showing examples of temporal changes in the rate at which the capacitance of an electric double-layer capacitor decreases at a potential difference of 5.5 V at a temperature of 95° C. when sulfuric acid and phosphoric acid were used as a water-soluble electrolyte, respectively.
Figure 10:
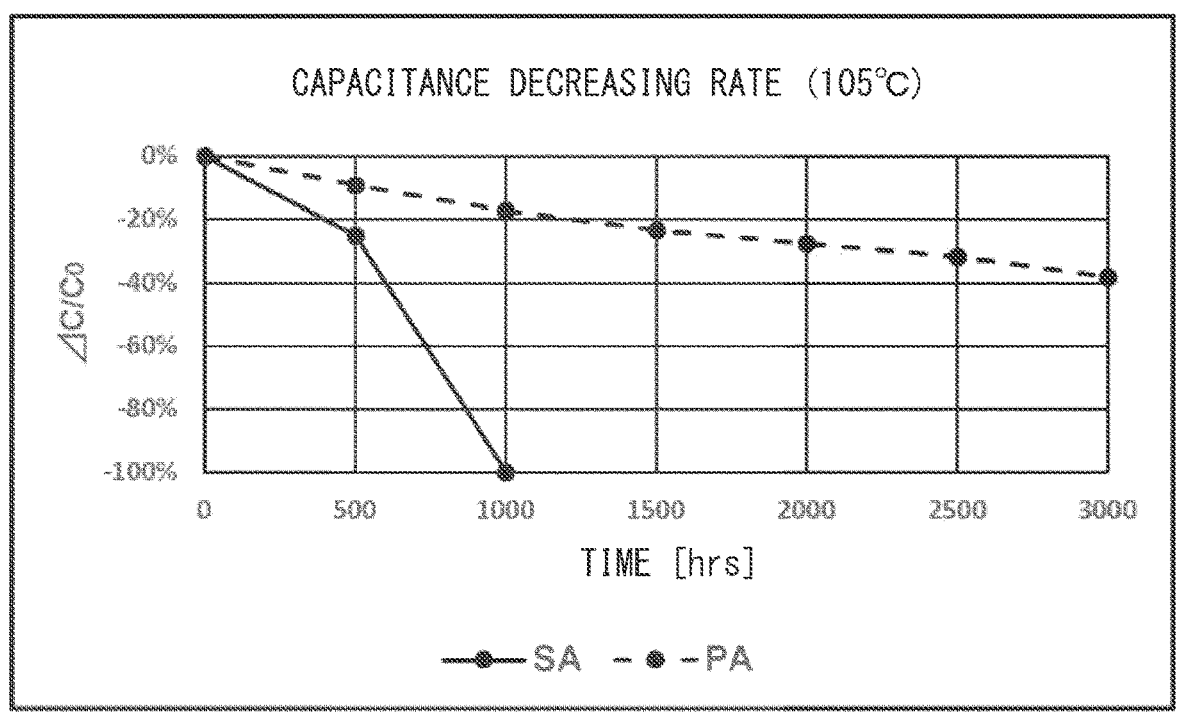
FIG. 10 is a graph showing examples of temporal changes in the rate at which the capacitance of an electric double-layer capacitor decreases at a potential difference of 5.5 V at a temperature of 105° C. when sulfuric acid and phosphoric acid were used as a water-soluble electrolyte, respectively.

Tables 4 to 6 show the results of the temporal changes of the rate at which the capacitance of each of the electric double-layer capacitors obtained in the respective examples had decreased from the initial value at temperatures (85° C., 95° C. and 105° C.), and FIGS. 8 to 10 show graphs based on these results.

Figure 4:
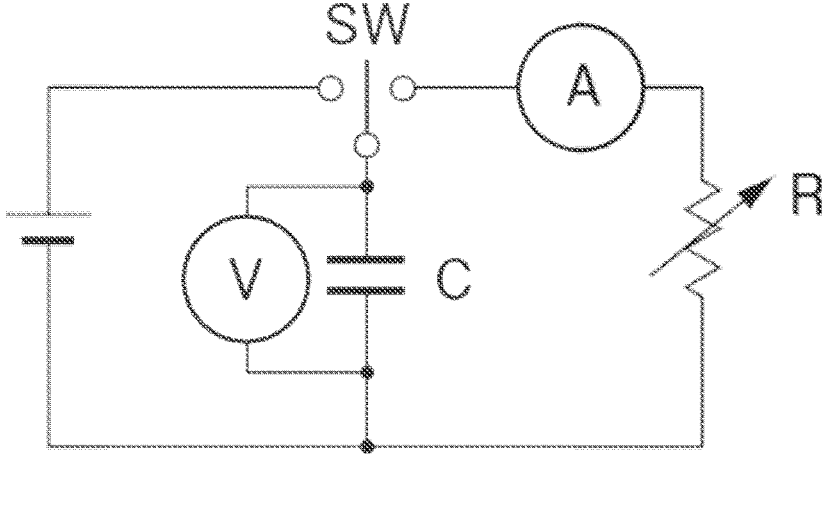
FIG. 4 is a schematic diagram of a circuit that is used when a capacitance is measured.

Note that the capacitance of each electric double-layer capacitor at each temperature was measured by a constant-current discharge method described below. That is, firstly, in a circuit shown in FIG. 4, after the terminal voltage of the electric double-layer capacitor reached the maximum working voltage, it was charged for 30 minutes. Next, by using a constant-current load apparatus, the electric double-layer capacitor was discharged at a current of 1 mA per rated capacitance of 1F, and a time over which the voltage between the terminals decreased from 60% of the rated voltage to 50% thereof was measured. Then, the capacitance was calculated by the below-shown formula. Note that in FIG. 4, V represents a voltmeter; A represents an ammeter; R represents a variable resistor; C represents a capacitor; and SW represents a switch.

Capacitance: $C = I \times (T2 - T1)/(V1 - V2)$

In the formula, C is the capacitance [F]; I is the discharging current [A]; V1 is a voltage when the voltage between the terminals is 60% of the rated voltage [V]; V2 is a voltage when the voltage between the terminals is 50% of the rated voltage [V]; T1 is a time [sec] over which the voltage between the terminals had reached 60% of the rated voltage; and T2 is a time [sec] over which the voltage between the terminals had reached 50% of the rated voltage.

TABLE 4

| | | | | | 85° C. | | | | |
|---|---|---|---|---|---|---|---|---|---|
| Time [hrs] | 0 | 500 | 1000 | 1500 | 2000 | 2500 | 3000 | 3500 | 4000 |
| SA | 0% | −11.9% | −17.1% | −19.6% | −24.5% | −26.5% | −44.8% | −97.3% | — |
| PA | 0% | −0.8% | −2.8% | −3.1% | −6.1% | −6.8% | −6.9% | −11.1% | −11.8% |

TABLE 5

| | | | | | 95° C. | | | | |
|---|---|---|---|---|---|---|---|---|---|
| Time [hrs] | 0 | 500 | 1000 | 1500 | 2000 | 2500 | 3000 | 3500 | 4000 |
| SA | 0% | −16.0% | −28.8% | −100.0% | — | — | — | — | — |
| PA | 0% | −4.2% | −10.6% | − 11.2% | −14.6% | −19.7% | −24.6% | −29.4% | −28.9% |

TABLE 6

| | | | | 105° C. | | | |
|---|---|---|---|---|---|---|---|
| Time [hrs] | 0 | 500 | 1000 | 1500 | 2000 | 2500 | 3000 |
| SA | 0% | −24.9% | −100.0% | — | — | — | — |
| PA | 0% | −9.3% | −17.1% | −23.3% | −27.4% | −31.7% | −38.1% |

Figure 11:
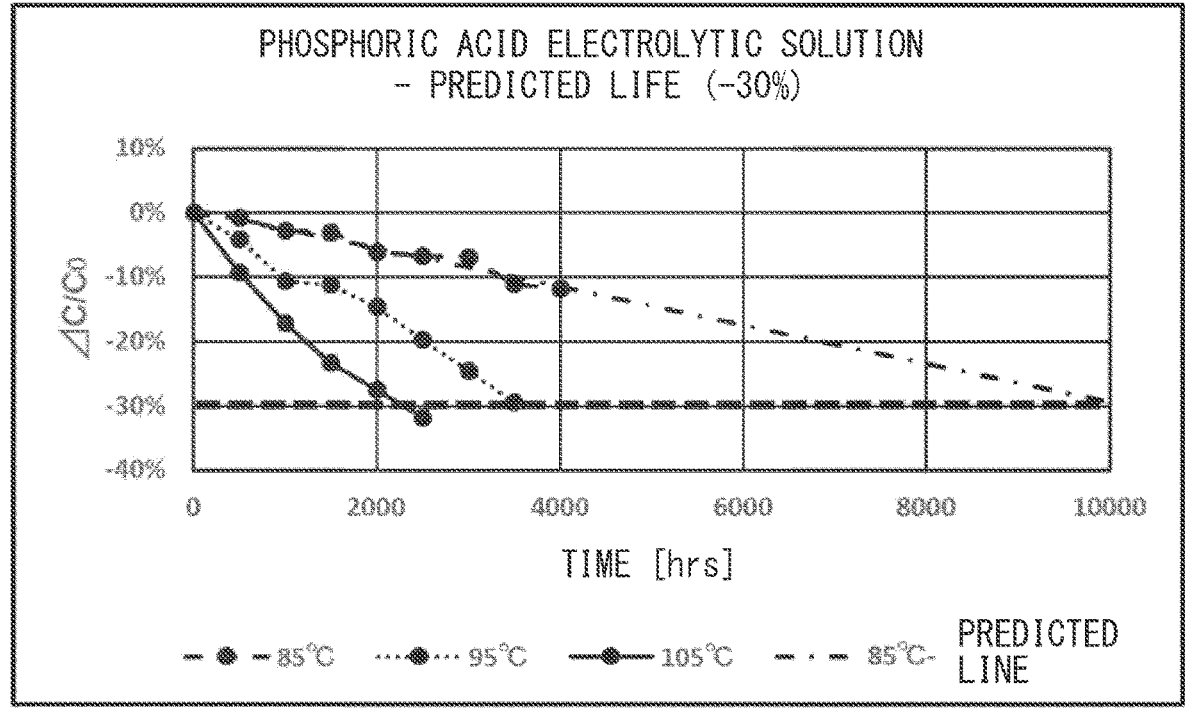
FIG. 11 is a graph showing examples of temporal changes in the rate at which the capacitance of an electric double-layer capacitor decreases from its initial value at various temperatures when phosphoric acid was used as a water-soluble electrolyte.

Further, FIG. 11 shows the result of the temporal changes of the rate at which the capacitance of the electric double-layer capacitor according to Example 1 had decreased from the initial value at temperatures (85° C., 95° C. and 105° C.). As shown in FIG. 11, it can be seen that in the electric double-layer capacitor according to Example 1, in which the phosphoric acid aqueous solution was used, it took 9,000 hours or more (a predicted value) at 85° C., 3,500 hours or more at 95° C., and 2,000 hours or more at 105° C. before the capacitance had reached a value that is obtained by subtracting, from the initial value, 30% thereof, thus meaning that it is possible to ensure the quality for a very long period of time. In contrast, in the electric double-layer capacitor according to Comparison Example 1, in which the sulfuric acid aqueous solution was used, it took about 2,500 hours at 85° C., about 1,000 hours at 95° C., and about 500 hours at 105° C. before the capacitance had reached the value that is obtained by subtracting, from the initial value, 30% thereof, so that the product life was shorter than that of the electric double-layer capacitor according to Example 1.

As described above, in an electric double-layer capacitor using a specific water-soluble electrolyte according to the present disclosure, it is possible to maintain a low leakage current over a long period of time even in a high temperature range (85° C.). Therefore, the reliability of the present electric double-layer capacitor in the high temperature range is high, thus enables an apparatus using the present electric double-layer capacitor to have a long life. Further, the electric double-layer capacitor according to the present disclosure can be used as a super-capacitor of which the high quality can be ensured for a long period of time even in an environment having a very high temperature of 105° C.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

The invention claimed is:

1. An electric double-layer capacitor using an aqueous electrolytic solution containing a water-soluble electrolyte of which a Hammett acidity function $H_0$ at a temperature of 25° C. is −2.8 or higher and a vapor pressure at a temperature of 100° C. is 400 mmHg or lower,
   wherein a concentration of the water-soluble electrolyte in the aqueous electrolytic solution is 65 to 77 mass %, and
   the water-soluble electrolyte is an acid selected from acetic acid, boric acid, phosphoric acid, oxalic acid, butyric acid, and dichloroacetic acid.

2. The electric double-layer capacitor according to claim 1, wherein a mass ratio between activated carbon contained in a polarized electrode and the aqueous electrolytic solution is 1:0.5 to 1:3.

3. The electric double-layer capacitor according to claim 1, wherein the aqueous electrolytic solution contains no sulfuric acid.

4. The electric double-layer capacitor according to claim 1, wherein the water soluble electrolyte is further selected from acetic acid, oxalic acid, and phosphoric acid.

* * * * *